(12) United States Patent
Bertoldo de Barros et al.

(10) Patent No.: US 8,945,653 B2
(45) Date of Patent: Feb. 3, 2015

(54) EXTRACTED WHOLE CORN KERNELS AND IMPROVED PROCESSED AND PROCESSABLE CORN PRODUCED THEREBY

(75) Inventors: Regina Celia Bertoldo de Barros, Minneapolis, MN (US); Michele Ann Majeski, Maplewood, MN (US); Frederic John Rigelhof, Maple Grove, MN (US); Lee Kent French, Lamberton, MN (US)

(73) Assignee: Suntava, LLC, Afton, MN (US)

( * ) Notice: Subject to any disclaimer, the term of this patent is extended or adjusted under 35 U.S.C. 154(b) by 160 days.

(21) Appl. No.: 13/113,683

(22) Filed: May 23, 2011

(65) Prior Publication Data

US 2011/0223307 A1  Sep. 15, 2011

Related U.S. Application Data

(63) Continuation-in-part of application No. 12/214,773, filed on Jun. 20, 2008, now Pat. No. 8,491,670.

(60) Provisional application No. 60/945,430, filed on Jun. 21, 2007.

(51) Int. Cl.
| | | |
|---|---|---|
| *A21D 13/00* | (2006.01) | |
| *A21D 2/00* | (2006.01) | |
| *A23L 1/00* | (2006.01) | |
| *C09B 61/00* | (2006.01) | |
| *A23L 1/10* | (2006.01) | |

(52) U.S. Cl.
CPC .............. *C09B 61/00* (2013.01); *A23L 1/1025* (2013.01); *A23L 1/1041* (2013.01)
USPC ............ 426/560; 426/622; 426/549; 426/618

(58) Field of Classification Search
CPC ...... A23L 1/1025; A23L 1/1041; C09B 61/00
USPC ................... 426/560, 549, 618, 622
See application file for complete search history.

(56) References Cited

U.S. PATENT DOCUMENTS

| | | | |
|---|---|---|---|
| 897,181 A | 8/1908 | Wiliams | |
| 987,088 A | 3/1911 | Perky | |
| 1,019,831 A | 3/1912 | Perky | |
| 1,021,473 A | 3/1912 | Perky | |
| 2,355,098 A * | 8/1944 | Musher | 252/398 |
| 3,462,277 A | 8/1969 | Reinhart | |
| 3,512,990 A | 5/1970 | Slaybaugh | |
| 4,089,259 A * | 5/1978 | Stickle et al. | 99/355 |
| 4,302,200 A | 11/1981 | Yokoyama et al. | |
| 4,320,009 A | 3/1982 | Hilton et al. | |
| 4,452,822 A | 6/1984 | Shrikhande | |
| 4,481,226 A | 11/1984 | Crosby et al. | |
| 4,500,556 A | 2/1985 | Langston | |
| 4,581,847 A | 4/1986 | Hibberd et al. | |
| 4,623,548 A | 11/1986 | Willard | |
| 4,623,550 A | 11/1986 | Willard | |
| 4,769,061 A | 9/1988 | Comai | |
| 4,810,648 A | 3/1989 | Stalker | |
| 4,940,835 A | 7/1990 | Shah et al. | |
| 4,975,374 A | 12/1990 | Goodman et al. | |
| 5,134,074 A | 7/1992 | Gordon et al. | |
| 5,266,317 A | 11/1993 | Tomalski et al. | |
| 5,384,253 A | 1/1995 | Krzyek et al. | |
| 5,550,318 A | 8/1996 | Adams et al. | |
| 5,591,616 A | 1/1997 | Hiei et al. | |
| 5,789,214 A | 8/1998 | Ryals et al. | |
| 5,858,742 A | 1/1999 | Fraley et al. | |
| 5,877,023 A | 3/1999 | Sautter et al. | |

(Continued)

FOREIGN PATENT DOCUMENTS

| | | |
|---|---|---|
| EP | 0333033 | 9/1989 |
| EP | 1191071 | 3/2002 |

(Continued)

OTHER PUBLICATIONS

P. Jing and M.M. Giusti Effects of Extraction Conditions on Improving the Yield and Quality of an Anthocyanin-Rich Purple Corn (Zea mays L.) Color ExtractJ. Food Sci. vol. 72, No. 7, 2007, C363-C368.*
Rooney, LW and EL Suhendro (2001) Food Quality of Corn. Chapter 3 in Snack Foods Processing Edited by W. Lusas CRC Press 2001 eBook ISBN: 978-1-4200-1254-5 DOI: 10.1201/9781420012545. sec2.*
http://www.cooksillustrated.com/tastetests/overview.asp?docid=10097.
http://www.feedmachine.com/articles/feed_ingredients/aeration2/.
http://columbustelegram.com/news/local/article_b300f044-32cb-11e0-b36a-001cc4c03286.html.
H.F. Ng, W.F. Wilcke & R.V. Morey, J.P. Lang; "Machine Vision Evaluation of Corn Kernel Mechanical and Mold Damage" vol. 41(2):415-420; 1998 American Society of Agricultural and Biological Engineers, www.asabe.org.

(Continued)

*Primary Examiner* — Humera Sheikh
*Assistant Examiner* — Subbalakshmi Prakash
(74) *Attorney, Agent, or Firm* — Mark A. Litman & Associates, P.A.

(57) ABSTRACT

A processed corn kernel product is obtained from an extraction process in which:
  an initial unprocessed whole corn kernel is mixed with water at solids levels of between 10% to 50% kernel/water to form a mixture;
  the mixture is maintained at a temperature of between 50° C. and 85° C. for at least 30 minutes to form a liquid extract and corn kernels desirably having a moisture content greater than 15% by weight of corn kernel solids;
  the corn kernels are physically separated from a liquid extract;
  and the corn kernels are dried until a kernel moisture level of <15% is obtained, produced a processed corn kernel product that retains at least 95% of the weight of the unprocessed corn kernels at the same moisture content (i.e., 15%).
The ≤5% extracted material may include, but is not limited to, soluble starches, carbohydrates, proteins, fats, oils, fibers, flavonoids, polyphenols, antioxidants, phenolic acids, dyes/pigments, and the like.

21 Claims, 1 Drawing Sheet

(56) References Cited

U.S. PATENT DOCUMENTS

| | | | |
|---|---|---|---|
| 5,886,244 | A | 3/1999 | Tomes et al. |
| 5,990,387 | A | 11/1999 | Tomes et al. |
| 6,767,999 | B2 | 7/2004 | Smirnov et al. |
| 6,822,144 | B1 | 11/2004 | Zhao et al. |
| 7,767,836 | B2 | 8/2010 | Cheryan |
| 2005/0125915 | A1 | 6/2005 | Ichi et al. |
| 2008/0313822 | A1 | 12/2008 | Bertoldo de Barros et al. |
| 2009/0007292 | A1 | 1/2009 | French |
| 2009/0054635 | A1 | 2/2009 | French |

FOREIGN PATENT DOCUMENTS

| | | |
|---|---|---|
| EP | 1477530 | 11/2004 |
| WO | WO9302197 | 2/1993 |
| WO | WO9400992 | 1/1994 |
| WO | WO9516776 | 6/1995 |
| WO | WO9518855 | 7/1995 |
| WO | WO9630530 | 10/1996 |

OTHER PUBLICATIONS

Junxiong Zhang, Yi Xun, Wei Li; "Identification and Detection of Surface Cracks of Corn Kernel Based on Computer Vision", 2007 American Society of Agricultural and Biological Engineers (ASAE Annual Meeting, 073090, www.asabe.org).

G. Mazza, E. Miniati; "Anthocyanins in Fruits, Vegetables, and Grains", pp. 227-230, 242-243; 1993 CRC Press.

General Anthocyanin Structure, http://www.micro-ox.com/chem_antho.htm.

Monica Giusti & Ronald Wrolstad; "Characterization and Measurement of Anthocyanins by UV-Visible Spectroscopy", John Wiley & Sons, Inc. 2001.

Monica Giusti, Ronald Wrolstad; "Acylated Anthocyanins from Edible Sources and Their Applications in Food Systems", Journal 14, pp. 217-225, Biochemical Engineering Journal 2003.

Bolivar Cevalloe-Casals, Luis Cisneros-Zevallos; "Stability of Anthocyanin-based Aqueous Extracts of Andean Purple Corn and Red-fleshed Sweet Potato Compared to Synthetic and Natural Colorants"; Food Chemistry 86 pp. 69-77, Food Chemistry 2004.

Romina Pedreschi, Luis Cisneros-Zevallos; Phenolic Profiles of Andean Purple Corn (Zea mays L.); Food Chemistry 100 pp. 956-963, Food Chemistry 2007.

"Purple Corn Extract Powder", http://www.detoxyourworld.com/acatalog/purple_corn.html.

"The Potential Health Benefits of Purple Corn", Herbal Gram 2005; The Journal of the American Botanical Council Issue: 65, pp. 46-49; http:www.herbalgram.org/iherb/herbalgram/articleview.asp?a=2779.

P. Jing, M.M. Guisti; "Effects of Extraction Conditions on Improving the Yield and Quality of an Anthocyanin-Rich Purple Corn (Zea mays L.) Color Extract", Journal of Food Science vol. 99. Nr.0. 2007.

Yolanda Salina Moreno, David Rubio Hernandez, Antonia Biaz Velazquez; "Extraccion y Uso de Pigmentos del Grano de Maiz (Zea mays L) Como Colorants en Yogur", (includes English translation of Summary); Official publication of Sociedad Latinoamericans de Nutricion. http://www.alanrevista.org/ediciones/2005-3/pigmentos_maiz_colorants_yogur.asp.

Burpee Review, "Corn Ruby Queen Hybrid (SE)"; http://www.burpee.com/product/vegetables/corn/corn+ruby+queen+hybrid+-+1+1+pkt.+(2008).

"Pigment Extraction by Whole Kernel Infusino Method—Laboratory Procedure" Suntava, LLC Rev. Jan. 3, 2008.

Rosso, Julee and Sheila Lukins. "The New Basics Cookbook," copyright 1989, published by Workman Publishing Company, Inc., NY, NY, pp. 230 and 233.

Blandino et al., Title: Determination of maize kernel hardness: comparison of different laboratory tests to predict dry-milling performance; J Sci Food Agric 2010; 90: 1870-1878 www.soci.org, copyright 2010 Society of Chemical Industry; Revised: Apr. 29, 2010 Accepted: Apr. 30, 2010, Published online in Wiley Interscience: Jun. 3, 2010—(www.interscience.wiley.com) DOI 10.1002/jsfa.4027.

* cited by examiner

| |
|---|
| Mix an initial unprocessed whole corn kernel having an initial moisture content of less than 15% by weight solids in the whole corn kernel with water at solids levels of between 10% to 50% kernel/water to form a mixture |
| The original unprocessed whole corn kernel contains at least 0.03% by total solids weight of at least one water soluble material selected from the group consisting of starches, carbohydrates, proteins, fats, oils, fibers, flavonoids, polyphenols, antioxidants, phenolic acids and dyes |
| The mixture is maintained at a temperature of between 50°C and 85°C for at least 30 minutes to a) form a liquid extract with the water and whole corn kernels from which at least some of the water soluble material has been extracted into the water and b) a whole corn kernel having a moisture content of at least 3% absolute moisture content higher than the unprocessed whole kernel |
| The whole corn kernels are physically separated from the liquid extract, the resulting liquid extract containing greater than 0.04% and up to 2.5% of the solids weight of the original unprocessed whole corn kernel and having a minimum of 0.05% by weight of the at least one water-soluble material originally in the unprocessed whole corn kernel |
| The corn kernels are dried until a kernel moisture level of less than 15% is obtained |
| A processed corn kernel product that still retains at least 97.5% of the solids weight of the initial unprocessed corn kernels is produced |

EXTRACTED WHOLE CORN KERNELS AND IMPROVED PROCESSED AND PROCESSABLE CORN PRODUCED THEREBY

RELATED APPLICATIONS DATA

This application is a Continuation-in-Part of U.S. patent application Ser. No. 12/214,773 Filed Jun. 20, 2008, titled "ANTHOCYANIN PIGMENT/DYE COMPOSITIONS AND METHOD OF PROVIDING COMPOSITION THROUGH EXTRACTION FROM CORN," which in turn claims priority from Provisional U.S. Patent Application Ser. No. 60/945,430 filed 21 Jun. 2007.

BACKGROUND OF THE INVENTION

1. Field of the Invention

The present invention relates to the field of corn kernels, extraction of ingredients from whole corn kernels, the production of processable, extracted whole corn kernels and processed corn products from the extracted whole corn kernels.

2. Background of the Art

U.S. Pat. No. 7,767,836 (Cheryan) discloses a process for removing oil from an agricultural substrate, including a dry grind corn. An ethanol solution with a concentration in the range of from about 90% to about 100% ethanol is mixed with the dry grind corn in a ratio of from about 10:1 to about 1:1 to form an extraction solution including the ethanol solution, oil, and corn solids. The extraction solution is separated into the corn solids and a filtrate, the filtrate including the ethanol solution and oil. The filtrate is membrane filtered, including nanofiltration, to restrain an oil concentrate from the filtrate and pass a permeate of the ethanol solution. The oil contained within the oil concentrate is purified. A process of extracting oil from raw corn, including the steps of: providing a reagent solution including ethanol having a concentration between 90-100%; mixing said reagent solution with the raw corn at a temperature between 50° C. and 90° C. to form an extraction solution comprising ethanol and compounds from the raw corn, said compounds including extracted oil, extracted protein mixture and corn solids; separating said extraction solution into corn solids and a filtrate, said filtrate comprising extracted oil and extracted protein compound mixture; membrane filtering the filtrate to pass an ethanol mixture through the membrane, said ethanol mixture containing ethanol and extracted oil to thereby separate a substantial amount of said extracted protein compound mixture; membrane filtering the ethanol mixture to restrain a substantial amount of said extracted oil for oil collection.

U.S. Pat. Nos. 4,623,548 and 4,623,550 describe dough that is prepared using pre-gelatinized cereal flours/starches, partially gelatinized cereal flours/starches, and raw flours/starches to form dough having moisture of 40-50% for preparing extruded and sheeted fried snacks. Gelatinization is a function of water penetration into the whole berry, temperature, and time, for a given type of grain. According to U.S. Pat. No. 4,179,527, the gelatinization of wheat starch involves a destruction of bonds in the crystalline regions of starch granules.

In U.S. Pat. No. 897,181, cereal grain or vegetable in whole form is wetted but not cooked and then passed repeatedly between grooved rollers and then baked. Boiling or steaming of the grain or vegetable, it is disclosed, produces considerable change in its chemical quality and a number of the nutritious soluble elements escape to the water.

In U.S. Pat. No. 3,462,277, a mixture of cereal flour or grits and water is passed through an extruder to gelatinize the starch while the dough is cooked and transformed into a rubber-like mass. The moisture content of the mixture is 13 to 35%. The continuous U-shaped extrudate is pinched off into segments by cutting rolls to form canoe-shaped cereal products. The separated canoe-shaped pieces are then dried to below 15% moisture.

In U.S. Pat. No. 3,512,990 a dough, made from farinaceous materials such as wheat, corn, oats, rice, potatoes, or legumes, is optionally partially or completely cooked with added moisture, to an approximate moisture content of about 30%. After this cooking step, the mixture is rendered homogeneous by passing it through an extruder or a hammer mill, such as Fitzmill. The milled or extruded product is dried to an approximate moisture content of 22 to 24%. The dried dough is then compacted between two rolls to provide a shredding effect and produce a sheet of dough having diamond-like regularly spaced perforations. The sheet of dough is then severed into strips, folded to form small biscuits, which are closed on three, sides and then deep-fried.

In U.S. Pat. Nos. 987,088, 1,019,831, and 1,021,473, corn or another grain is ground and immersed in an amount of water which is limited to that which will be taken up by the grain during cooking. The purpose of this is to preserve in the cooked article the aroma and other properties of the grain, which might otherwise be carried off or dissipated by the evolution of steam or vapor. In these processes, the cooked dough is extruded through a perforated plate to obtain filaments.

SUMMARY OF THE INVENTION

A corn product is obtained by an extraction process such as batch, continuous or semi-continuous that is performed so as to limit the types of ingredients that are removed from the whole corn kernels during extraction. The extraction process includes at least the steps of:

Mixing whole corn kernels with water at solids levels of about 10% to 50%;

Incubating the mixture at a temperature between about 50° C. and 85° C. for about 30 minutes to 3 hours;

Removing the whole corn kernels from the liquid extract by means of filtration;

Drying the whole corn kernels until a kernel moisture level of about ≤15% is obtained.

The extraction procedure removes at least some but retains at least 95% of the original total weight consisting of starches, carbohydrates, proteins, fats, oils, fibers, flavonoids, polyphenols, antioxidants, phenolic acids, dyes/pigments and other minor constituents of the original unprocessed whole corn kernel. The remaining corn is more readily processed (grinding, milling, gelatinized, etc.) while retaining protein, oil and starch content and desired levels of antioxidants, phenolic acids, polyphenols and flavonoids while at the same time having less contaminants for safer use in human consumption.

BRIEF DESCRIPTION OF THE FIGURES

FIG. 1 shows a block diagram of a process according to the present invention.

DETAILED DESCRIPTION OF THE INVENTION

A corn product is obtained by an extraction process that is performed so as to limit the types of ingredients that are removed from the whole corn kernels during extraction. The extraction is intended to and causes removal of at least some chemical components within the whole corn kernel of typically at least 0.01% (up to whatever concentration of the ingredient is within the kernel and may be removable, such as up to 0.1%, up to 0.5%, up to 1.0%, up to 3.0% etc.), at least 0.03% or between 0.05%-2.5% solids consisting of starches, carbohydrates, protein, fats, oils, fibers, polyphenols, flavonoids, phenolic acids, antioxidants, dyes/pigments and other minor constituents of the original unprocessed whole corn kernel to maintain a desired level of properties of those components. In spite of the removal of some components, the kernel maintains substantive utility as a storage-stable food source for additional processing while improving the processing-compatible properties of the kernel by retaining some, but not all of the extracted ingredients which can weigh up to 2.5%, or even up to 5.0% of total weight of the original whole kernel ingredient while retaining greater that 99% by weight of the insoluble ingredients that are desirable in the corn kernel product. The extraction process includes at least the steps of: mixing whole corn kernels with water at solids levels of about 10% to 50%; incubating the mixture at a temperature between about 50° C. and 85° C. for about 30 minutes to 3 hours; removing the whole corn kernels from the liquid extract by filtration, decanting, screening, sieving, centrifuging or any alternative method; and drying the whole corn kernels until a kernel moisture level of <15% is obtained. Another aspect of the present technology is as a processed corn kernel product obtained from an extraction process. In that process:

Among the additional practices may be a flour product that is produced from the milling of a sterile corn kernel or a processed whole kernel corn that is unable to germinate after having been treated in step b) under process conditions of at least 60° C. for 30 min to 3 hours.

a) an initial unprocessed whole corn kernel having an initial moisture content of less than 15% by weight solids in the whole corn kernel is mixed with water at solids levels of between 10% to 50% kernel/water to form a mixture, the original unprocessed whole corn kernel containing at least 0.03% by total solids weight of at least one water soluble material selected from the group consisting of starches, carbohydrates, proteins, fats, oils, fibers, flavonoids, polyphenols, antioxidants, phenolic acids and dyes;

b) the mixture is maintained at a temperature of between 50° C. and 85° C. for at least 30 minutes to a) form a liquid extract with the water and whole corn kernels from which at least some of the water soluble material has been extracted into the water and b) a whole corn kernel having a moisture content of at least 3% absolute moisture content higher than the unprocessed whole kernel;

c) the whole corn kernels are physically separated from the liquid extract, the resulting liquid extract containing greater than 0.04% and up to 2.5% of the solids weight of the original unprocessed whole corn kernel and having a minimum of 0.05% by weight of the at least one water-soluble material originally in the unprocessed whole corn kernel; and d) the corn kernels are dried until a kernel moisture level of less than 15% is obtained, to produce a processed corn kernel product that still retains at least 97.5% of the solids weight of the initial unprocessed corn kernels.

One aspect of the present technology is as a processed corn kernel product obtained from an extraction process in which:

an initial unprocessed whole corn kernel is mixed with water at solids levels of between 10% to 50% kernel/water to form a mixture, the original unprocessed whole corn kernel containing at least 0.05% (e.g., alternatively at least 0.1%, at least 0.2% or at least 0.3% or more) by total solids weight of at least one water soluble material selected from the group consisting of starches, carbohydrates, proteins, fats, oils, fibers, flavonoids, polyphenols, antioxidants, phenolic acids and dyes;

the mixture is maintained at a temperature of between 50° C. and 85° C. for at least 30 minutes (e.g., up to hours as desired) to form a liquid extract and whole corn kernels;

the whole corn kernels are physically separated from the liquid extract, the resulting liquid extract containing up to 1.0%, 1.5%, 2.0%, 2.5%, 3.0%, 4.0% or 5.0% of the weight of the original unprocessed whole corn kernel and having a minimum of 0.01% by weight (or more, as indicated above) of the at least one water-soluble material of the original unprocessed whole corn kernel;

and the corn kernels are dried until a kernel moisture level of <15% is obtained, produced a processed corn kernel product that retains at least 95%, 96%, 97.5% or more of the solids weight of the unprocessed corn kernels at 15% moisture content.

The processed corn kernel liquid extract may contain up to 5% of the weight of the original unprocessed whole corn kernel and preferably having a minimum of 0.05% by weight (e.g., 0.10%, 0.20%, 2.0%, 5.0%, 8.0%, 10% up to 90%) of the at least one water-soluble material of the original unprocessed whole corn kernel; and the corn kernels are dried until a kernel moisture level of <15% is obtained, produced a processed corn kernel product that retains at least 95% of the weight of the unprocessed corn kernels at 15% moisture content. The initial corn kernel may consist of at least 90% by weight whole kernels and the remaining 10% of corn kernels comprising broken or fractured corn that has not been ground.

The extraction procedure removes at least some of water soluble components but retains at least 95% of the total weight in starches, carbohydrates, protein, fats, oils, fibers, polyphenols, flavonoids, phenolic acids, antioxidants, dyes/pigments, etc of the original unprocessed whole corn kernel. The corn is more readily processed (grinding, milling, gelatinized, etc.) while retaining protein, oil and starch content and desired levels of color.

Numerous food products such as corn chips and corn cereal are manufactured using a mixture of corn fractions such as flour, germ, grits, meal, etc. Other products are made directly from ground unprocessed whole kernels.

The technology described herein differs from prior art. It utilizes whole corn kernels (e.g., blue corn, purple corn, red corn, black corn, brown corn, yellow corn, white corn, etc. and corn types such as dent, flint, popcorn, sweet corn, etc.) previously mildly washed/extracted with water for the production of anthocyanin, phenolic acids, polyphenols, flavonoids, etc products and subsequently dried for additional use in other high value food products. The fact that the kernels are previously extracted (processed) makes them unique from other grains that can be made into chips, cereals and the like. These previously processed kernels are clean, free of many potential contaminants such as mold, heavy metals and toxins and have important functional differences that may benefit many applications. These processed kernels are surprisingly soft and require less force to crack them prior to or during subsequent processing as seen by means of hardness tests. The processed corn is softer when fractionated, easier to grind and yields finer flour products as compared to conventional corn kernels of the same variety, which is evidenced in granulation tests. Finer flours are beneficial for some applications such as tortillas (Cook's Country. http://www.cooksillustrated.com/tastetests/overview.asp?docid=10097). Starch damage is a critical issue in some applications since it influences starch gelatinization, pasting properties, viscosity, etc. Furthermore, the processed kernels still contain a significant amount of phenolics, flavonoids and antioxidants, etc even though some have been intentionally extracted for separate commercial use.

The use of the Rapid Visco Analyzer instrument (RVA) as an instrument to evaluate starch gelatinization and pasting properties is desirable in evaluating aspects of this invention. The RVA is widely used to evaluate functional characteristics of starches, proteins, etc. The processed kernels are visually similar to the unprocessed kernels and the results for composition (starches, fat/oils, protein, etc) are comparable (though some functional differences are noteworthy) as well. The RVA technique allows for evaluation and characterization of basic functional properties between these kernels. A review of the RVA and its use in the evaluation of starches is presented herein. A copy of one of the RVA profiles showing the difference between processed (e.g., extracted) and unprocessed corn is also attached, as well as data on granulation, hardness tests, composition, mold/yeast, heavy metals comparing processed and unprocessed material.

Preferred Materials Used—Source
  Whole purple corn kernels, washed/extracted and dried (processed) (see Applicants' copending U.S. patent application Ser. Nos. 12/214,773, 12/143,159, and 12/143,079, which are incorporated herein by reference in their entirety.
  Whole purple corn kernels, 'as is' (unprocessed)
  Whole meal flours from both processed and unprocessed kernels Work Performed Whole purple corn kernels were extracted in various experiments to assess the impact of the process in the composition, functionality, cleanliness, microbial activity, etc. The experiments covered standard extraction protocols with a range of typical extraction temperatures from 50° C.-85° C., although with balancing of time, stirring, ancillary materials in the water and the like, a broader range of temperatures can be used. The experiment used weaker acids such as citric acid with higher temperature combinations and also used stronger acids and relatively low temperature combinations for the extraction since stronger acid mixtures (10% HCl and 0.1% Citric acid) are used in prior art for extraction of anthocyanin in purple corn. Although these tend to modify the anthocyanins, the processed products of the present technology produced thereby are still useful.

Example 1

One such experiment used a standard extraction process with water to kernel ratio of 60:40 (333 g of whole kernels to 417 g of deionized water using an average initial 10% moisture kernel) placed in a 1 L Pyrex bottle. The bottle was carefully capped and the mixture of water and whole kernels was incubated for a determined amount of time at a specific temperature. Samples were run in duplicate as such: Sample A was extracted at 70° C. in a reciprocal water bath for 90 minutes at 90 rpm, the mixture poured through a colander to separate the kernels from the water extract, the kernels poured back into the 1 L Pyrex bottle containing 417 g of deionized water and placed at the same 70° C. water bath at 90 rpm for 30 more minutes. The mixture was then again poured through a colander to separate the kernels from the second water extract. The extracts were combined and filtered through a glass filter for analysis. The kernels were set aside to dry. Sample B was extracted with added 0.417 g citric acid monohydrate at 70° C. in a reciprocal water bath for 90 minutes at 90 rpm, the mixture poured through a colander to separate the kernels from the water extract, the kernels poured back into the 1 L Pyrex bottle containing 417 g of deionized water (no citric) and placed at the same 70° C. water bath at 90 rpm for 30 more minutes. The mixture was then again poured through a colander to separate the kernels from the second water extract. The extracts were combined and filtered through a glass filter for analysis. The kernels were set aside to dry. Sample C was extracted with 10% of the water volume as straight HCl and added 0.417 g citric acid monohydrate at 35° C. in a reciprocal water bath for 40 minutes at 90 rpm, the mixture poured through a colander to separate the kernels from the water extract. The extract was filtered through a glass filter for analysis. The kernels were set aside to dry. Kernels from individual experimental tests (A, B and C) were poured into glass baking dishes and dried in an air oven at 50° C. for 5½ hours then air dried on benchtop so as not to over dry the kernels and achieve moisture levels approximately between 10-15%. In all cases, the processed kernels plus unprocessed control kernels were ground through a hand mill (Back to Basics Grain Mill) using the finer grind setting (tighter fit), sieved through a US #20 sieve and then sieved through a US #60 sieve. The fine flour material resulting from the US #60 sieve was used for tests using the RVA.

The RVA was set using the "standard 1" profile which is commonly used for starch characterization. The profile is added as an appendix to this document. Prior to running the RVA, the flours were analyzed for moisture content and the slurry to be used in the RVA was weighed out/adjusted to achieve 14% moisture basis. In the RVA, a flour slurry (flour and water) was mixed 5× by inversion and immediately placed in the RVA for analysis. The instrument mixes the material for 13 minutes ramping up the temperature for 50° C. to 95° C. with a hold time at 95° C. and subsequent ramping back down to 50° C. During that time, the flour slurry displays a profile curve of specific characteristics which are depending on its starch quality, content, type and other components. The RVA curves for the samples evaluated (A, B, C and control) are included as an appendix in this document. RVA tests were run in triplicates. The RVA results indicated that sample A and B showed higher peak and final viscosity as well as peak time than sample C and control sample.

The kernels produced were also subsequently ground using a hand mill (not sieved) and used to measure pH based on a 10% slurry comprising of 10:90 flour to deionized water. Samples A, B, C and unprocessed control kernels) had pH values of 5.8, 5.7, 3.6 and 5.8, respectively. Yellow and white corn kernels were also measured using the same procedure and had values of 6.2 and 6.3 pH, respectively. This suggests that kernels processed with citric acid yields flour with a higher acidity level than unprocessed kernels, with the extra acidity derived from a non-mineral acid which is commonly used in food applications. Higher acidity flour may be beneficial for long term stability as well as specific applications.

The resulting processed corn kernels (Samples A and B) also retained sufficient amounts of anthocyanins, at least 50% of the original anthocyanin content, compared to the control unprocessed corn kernels. The procedure for anthocyanin measurements are attached in the appendix at the end of this document. Table 1 below shows the data:

TABLE 1

Anthocyanin Calculations

| Sample | Wavelength | DF | O.D. | MW | ε | Mono. Antho. (mg/L) | Color Units (Abs × Dil) | E1 % | % Antho* | Antho Remaining | CU Remaining |
|---|---|---|---|---|---|---|---|---|---|---|---|
| pH 3.0 - citrate buffer | | | | | | | | | | | |
| Unprocessed | peak | 5 | 1.897 | 449.2 | 26900 | 158.39 | 9.5 | 0.095 | 0.03 | NA | NA |
| Processed 'As Is,' 70 C., Dried | peak | 5 | 1.090 | 449.2 | 26900 | 91.01 | 5.5 | 0.055 | 0.02 | 57% | 57% |
| Processed 0.1% citric acid, 70 C., Dried | peak | 5 | 1.098 | 449.2 | 26900 | 91.68 | 5.5 | 0.055 | 0.02 | 58% | 58% |
| Processed 10% HCl 0.1 citric acid, 35 C., Dried | peak | 5 | 1.929 | 449.2 | 26900 | 161.06 | 9.6 | 0.096 | 0.03 | 102% | 102% |
| pH 1.0 - E5S1 | | | | | | | | | | | |
| Unprocessed | peak | 10 | 1.129 | 449.2 | 26900 | 188.53 | 11.3 | 0.113 | 0.04 | NA | NA |
| Processed 'As Is,' 70 C., Dried | peak | 10 | 0.581 | 449.2 | 26900 | 97.02 | 5.8 | 0.058 | 0.02 | 51% | 51% |
| Processed 0.1% citric acid, 70 C., Dried | peak | 10 | 0.562 | 449.2 | 26900 | 93.85 | 5.6 | 0.056 | 0.02 | 50% | 50% |
| Processed 10% HCl 0.1 citric acid, 35 C., Dried | peak | 10 | 1.080 | 449.2 | 26900 | 180.35 | 10.8 | 0.108 | 0.04 | 96% | 96% |

Example 2

In another procedure, whole corn kernels were extracted using standard extraction process with water to kernel ratio of 60:40 (333 g of whole kernels to 417 g of deionized water using an average 10% moisture kernel) placed in a 1 L Pyrex bottle. This example was conducted with a typical corn kernels and with corn kernels specifically chosen to contain large amounts of mold/yeast. The bottle was carefully capped and the mixture of water and whole kernels was incubated at 60° C. Samples were run in duplicate as such: extracted at 60° C. in a reciprocal water bath for 90 minutes at 90 rpm, the mixture poured through a colander to separate the kernels from the water extract, the kernels poured back into the 1 L Pyrex bottle containing 417 g of deionized water and placed at the same 60° C. water bath at 90 rpm for 90 more minutes. The mixture was then again poured through a colander to separate the kernels from the second water extract. The extracts were combined and filtered through a glass filter for analysis. The kernels were set aside to dry in an air oven at 50° C. and monitored by weight to achieve a moisture level of approximately 10-15%.

The processed kernels (typical corn kernels) were tested for starches, oil and protein composition, as well as density, hardness and particle size distribution. Those results are attached in the appendix at the end of this document. The resulting processed kernels were clean corn kernels that retained sufficient amounts of anthocyanin and original starches, proteins and oils. The processed kernels cracked with lower force and have lower density values (lb/ft3) than unprocessed ones.

In addition, processing of the corn kernels specifically chosen to contain large amounts of mold/yeast, showed that the elevated processing temperatures reduced yeast, mold and other potential contaminants found in unprocessed kernels. Results are attached in the appendix at the end of this document.

Example 3

The clean processed kernels from the typical corn kernels resulting from the experiment described above (Example 2) were tested for hardness and then ground separately in a hammer mill to produce flour. The flour granulation and particle size distribution was analyzed to identify differences in grinding characteristics. Results indicated that the flour produced from the processed kernels had finer particle size distribution than the unprocessed kernels. Results also indicated that the processed kernels required less force to crack than the unprocessed kernels, which implies that those kernels were softer in nature.

The flours were suitable to be used for the manufacturing of high value products such as chips, cereals, etc. with subsequent processing.

Both processed and unprocessed control kernels were also ground using a hammer mill and sieved through various U.S. sieve sizes to obtain flours for use in the RVA instrument. The RVA was used following the manufacturer's guidance, with moisture adjustment at 14% and following protocol "standard 1" (std1.pfl) for temperature/rpm/time tests.

Example 4

In this example, unprocessed whole corn kernels were extracted twice in a reciprocating heated water bath at 60° C. between 60-90 min for each extraction at water to kernel ratio of 60:40. After extraction, the processed kernels were dried in an air oven at 50° C. until a kernel moisture level of <15% was obtained. Both processed and unprocessed kernels were analyzed for % starch, protein and oil content. The processed corn kernels obtained from this test example retained at least 95% of the original starch, protein and oil content of the unprocessed corn kernels. Data can be seen in table below:

TABLE 2

Corn Kernel Composition

| | Oil (oil-ether extraction), dry basis | Protein, dry basis | Starch, dry basis |
|---|---|---|---|
| 2006 Unprocessed Kernels | 4.34% | 10.13% | 74.1% |
| 2006 Processed Kernels | 4.26% | 9.68% | 72.1% |

Scope of Technology Advance

The procedure detailed above advances the utilization of corn kernels and especially the darker varietals such as purple corn kernels in various manufacturing processes to the extent that:

a) It may provide a new raw material source that is free of many contaminants such as yeast, mold, etc.

The moisture content of the grain or legume has a major impact on how long it may be kept in storage and still remain nutritious and edible. There is considerable variation in storage conditions as well as seasonal storage variation due to cycling between warm and cold temperatures that affect the moisture content, quality and spoilage stability of the corn. The available literature states that grain with a moisture content as high as 13% can be safely put up, but there is a risk to keeping it at that level that should be understood.

The outside of every kernel of grain and bean that a user buys or grows hosts thousands of fungi spores and bacteria. This is all perfectly natural and is not a reason for alarm. The problem lies in that at moisture levels above 13.5% some fungal species and bacteria are able to grow and reproduce. If the user has grain with moisture content higher than 13%, that moisture content is perilously close to having enough moisture to enable mold growth which could lead to spoilage and loss of the product. For these reasons, the technology described herein is important because it provides a new raw material source that is free of many such contaminants such as yeast, mold, etc.

References (Related to the Moisture Issue Described Immediately Above)
- a—Grain Storage: Considerations to maintain Quality: Part 2—moisture Temperature Storage Capability, which is submitted with this application and incorporated herein by reference. http://www.feedmachine.com/articles/feed_ingredients/aeration2/
- b—Guideline for Mold Control in High. Moisture Corn, USDA Bulletin No. 2238. Tables N3.1-N3.3, which is submitted with this application and incorporated herein by reference.
- c—Keep grain at safe moisture levels when in storage, which is submitted with this application and incorporated herein by reference. http://columbustelegram.com/news/local/article_b300f044-32cb-11e0-b36a-001cc4c03286.html b) It may provide such clean raw material with minimally changed basic composition of starches, proteins, oils, etc., as well as significant amounts of antioxidants, flavonoids, pigments/dyes (where applicable), etc. The minimal differences in composition, however, may offer a significant degree of change in functional characteristics of the flour derived from the processed kernels. The processed kernels cracked with lower force and had lower density values than unprocessed ones. These hardness tests show large standard deviation but there is enough difference to suggest that the processed kernels are softer, easier to mill and provides a finer flour as indicated in point see below (see report titled Evaluation of Two Treatments of Red Corn attached).

c) It may provide a source of raw material which will yield softer, finer flour with differences in starch functionality favorable for some applications in cereals, muffins, tortillas, etc.

d) It may greatly minimize by-product waste allowing the nearly intact kernels to be used or stored for other purposes such as manufacturing of other high value products such as cereal, chips, etc.

e) It may provide a source of raw material which will yield softer, finer flour with differences in starch functionality favorable for some applications in cereals, muffins, tortillas, etc with enough coloration to impart favorable characteristics for some applications in cereals, muffins, tortillas, etc. It is to be noted that the final softness is not a reflection of initial moisture content or final moisture content in the kernels and flour, respectively.

f) It may provide a source of clean raw material which can yield finer flour with modified starch characteristics and remaining color characteristics. It may also contain a higher acidity level than the typical unprocessed kernel with the acidity derived from a non-mineral acid (e.g., citric acid) which is commonly used in food applications (if the whole kernels are processed with non-mineral acid, such as citric acid). This higher acidity product may enhance the characteristics, flavor and quality of baked goods and other food products.

g) It may provide a method to evaluate the functional characteristics of the processed kernels in comparison to unprocessed kernels.

Although specific numbers, compositions and apparatus have been described in this document, those descriptions are intended to be specific disclosures within the described generic scope of the present invention. Those examples are not intended to limit the scope of enforcement of the claims, unless the claims are specifically limited.

We claim:

1. A processed corn kernel product obtained from an extraction process in which: a) an initial unprocessed whole corn kernel having an initial moisture content of less than 15% by weight solids in the whole corn kernel is mixed with water at solids levels of between 10% to 50% kernel/water to form a mixture, the original unprocessed whole corn kernel containing at least 0.03% by total solids weight of at least one water soluble material selected from the group consisting of starches, carbohydrates, proteins, fats, oils, fibers, flavonoids, polyphenols, antioxidants, phenolic acids and dyes; b) the mixture is maintained at a temperature of between 50° C. and 85° C. for at least 30 minutes to i) form a liquid extract with the water and whole corn kernels from which at least some of the water soluble material has been extracted into the water and ii) a whole corn kernel having a moisture content of at least 3% absolute moisture content higher than the unprocessed whole kernel; c) the whole corn kernels are physically separated from the liquid extract, the resulting liquid extract containing greater than 0.04% and up to 2.5% of the solids weight of the original unprocessed whole corn kernel and having a minimum of 0.05% by weight of the at least one water-soluble material originally in the unprocessed whole corn kernel; and d) the corn kernels are dried until a kernel moisture level of less than 15% is obtained, to produce a processed corn kernel product that still retains at least 97.5% of the solids weight of the initial unprocessed corn kernels to form the processed corn kernel product.

2. The processed corn kernel of claim 1 wherein the liquid extract containing up to 5% of the weight of the original unprocessed whole corn kernels and having a minimum of 0.05% by weight of the at least one water-soluble material of the original unprocessed whole corn kernels have been separated from the whole corn kernel after extraction, leaving extracted whole corn kernel; and the whole corn kernels after extraction are dried until a kernel moisture level of <15% is obtained, providing a processed extracted whole corn kernel product that retains at least 95% of the weight of the original total weight of at least one component selected from the group consisting of starches, carbohydrates, protein, fats, oils, fibers, polyphenols, flavonoids, phenolic acids and antioxidants in the unprocessed corn kernels at 15% moisture content.

3. The corn kernel product of claim 1 wherein the initial corn kernels consist of at least 90% by weight whole kernels and the remaining 10% of corn kernels comprising broken or fractured corn that has not been ground and the corn Kernel product comprises a processed corn kernel product that retains at least 95% of the weight of the original total weight of at least one component selected from the group consisting of starches, carbohydrates and protein as in the unprocessed corn kernels.

4. The corn kernel product of claim 1 wherein the initial corn kernels consist of at least 50% by weight of corn selected from the group consisting of blue corn, purple corn, red corn, black corn, brown corn, yellow corn, white corn, dent corn, flint corn, popcorn corn, and sweet corn and the corn kernel product comprises a processed corn kernel product that retains at least 95% of the weight of the original total weight of at least one component selected from the group consisting of starches, carbohydrates and protein as in the unprocessed corn kernels.

5. The corn kernel product of claim 2 wherein the content of at least one contaminant selected from the group consisting of mold, yeast, heavy metals, mycotoxins and coliforms is present in the processed corn kernel product at an amount that is at least 50% less than an amount of contaminant in the initial unprocessed whole corn kernels.

6. The corn kernel product of claim 1 wherein kernel hardness of the corn kernel product measured by a crush test has at least a 10% lower mean force value than the initial unprocessed whole corn kernels and the corn kernel product comprises a processed corn kernel product that retains at least 95% of the weight of the original total weight of at least one component selected from the group consisting of starches, carbohydrates and protein as in the unprocessed corn kernels.

7. The corn kernel product of claim 1 wherein the corn kernel product solids density is at least 0.05% lower than that of the initial unprocessed whole corn kernel and the corn kernel product comprises a processed corn kernel product that retains at least 95% of the weight of the original total weight of at least one component selected from the group consisting of starches, carbohydrates and protein as in the unprocessed corn kernels.

8. The corn kernel product of claim 7 wherein the corn kernel still retains at least 0.01% by total weight of the original unprocessed whole corn kernels weight of total corn kernel solids of at least one water-soluble compound selected from the group consisting of antioxidants, flavonoids, phenolic acids, and pigments/dyes.

9. The corn kernel product of claim 7 wherein the protein content of the processed corn kernel is at least 95% of that of the unprocessed corn kernel.

10. The corn kernel product of claim 7 wherein the starch content of the processed corn kernel is at least 95% of that of the unprocessed corn kernel.

11. A flour product obtained from milling the corn kernel product of claim 7.

12. A food product obtained by cooking a composition comprising at least 5% by weight of the flour of claim 11.

13. A food product as in claim 12 wherein the food product is selected from the group consisting of an extruded snack, cereal, chips, tortilla, tacos, cookies, muffin and bread.

14. The corn kernel product of claim 1 further comprising residue of a non-mineral food grade acid used during the extraction process.

15. The corn kernel product of claim 3 wherein further comprising residue of a non-mineral food grade acid used during the extraction process and the food grade acid is selected from the group including but not limited to of citric acid, tartaric acid and fumaric acid.

16. A flour product from claim 11 wherein the flour has higher acidity level than the acidity level of the unprocessed corn kernels when the unprocessed corn kernels are milled.

17. A food product according to claim 11 wherein the food product is selected from the group consisting of an extruded snack, cereal, chips, tortilla, tacos, cookies, muffin and bread.

18. A flour product according to claim 11 that is produced from the milling of a sterile corn kernel.

19. A processed whole kernel corn product according to claim 1 that is unable to germinate after having been treated in step b) under process conditions of at least 60° C. for 30 min to 3 hours.

20. The processed whole kernel corn product of claim 1 in which the initial unprocessed whole corn kernels having an initial moisture content of less than 15% by weight solids in the whole corn kernels have been extracted with a liquid consisting of water at a kernel/water ratio ranging between 10% to 50% to form the mixture so that the liquid extract consists of water and ingredients extracted from the whole corn kernels.

21. The processed whole kernel corn product of claim 2 in which the initial unprocessed whole corn kernels having an initial moisture content of less than 15% by weight solids in the whole corn kernels have been extracted with a liquid consisting of water at a kernel/water ratio ranging between 10% to 50% to form the mixture so that the liquid extract consists of water and ingredients extracted from the whole corn kernels.

* * * * *